US011942665B2

United States Patent
Yoshida et al.

(10) Patent No.: US 11,942,665 B2
(45) Date of Patent: Mar. 26, 2024

(54) SEPARATOR MEMBER FOR FUEL CELL, AND METHOD FOR MANUFACTURING SAID SEPARATOR MEMBER

(71) Applicant: Arisawa MFG. Co., Ltd., Niigata (JP)

(72) Inventors: Akira Yoshida, Niigata (JP); Kio Miyaji, Niigata (JP); Kenichi Watabe, Niigata (JP)

(73) Assignee: ARISAWA MFG. CO., LTD., Niigata (JP)

( * ) Notice: Subject to any disclaimer, the term of this patent is extended or adjusted under 35 U.S.C. 154(b) by 0 days.

(21) Appl. No.: 17/923,814

(22) PCT Filed: May 20, 2021

(86) PCT No.: PCT/JP2021/019240
§ 371 (c)(1),
(2) Date: Nov. 7, 2022

(87) PCT Pub. No.: WO2021/246189
PCT Pub. Date: Dec. 19, 2021

(65) Prior Publication Data
US 2023/0178758 A1    Jun. 8, 2023

(30) Foreign Application Priority Data
Jun. 5, 2020   (JP) ................ 2020-098939

(51) Int. Cl.
H01M 8/0228    (2016.01)
H01M 8/0213    (2016.01)
H01M 8/0221    (2016.01)

(52) U.S. Cl.
CPC ....... *H01M 8/0228* (2013.01); *H01M 8/0213* (2013.01); *H01M 8/0221* (2013.01)

(58) Field of Classification Search
CPC .................................................. H01M 8/0228
See application file for complete search history.

(56) References Cited

U.S. PATENT DOCUMENTS

2003/0162079 A1    8/2003  Ooma et al.
2014/0087287 A1*   3/2014  Suzuki ................ H01M 8/0247
                                                      429/479
(Continued)

FOREIGN PATENT DOCUMENTS

CN    101061553 A    10/2007
CN    101071876 A    11/2007
(Continued)

OTHER PUBLICATIONS

Office Action dated Mar. 3, 2023, issued for the corresponding KR patent application No. 10-2022-7038892 and the English machine translation.
(Continued)

*Primary Examiner* — Brian R Ohara
(74) *Attorney, Agent, or Firm* — Ohlandt, Greeley and Perle, LLP

(57) ABSTRACT

A separator member for a fuel cell includes: a first resin layer including a resin; and a graphite layer that is layered on the first resin layer and substantially made of graphite. The layering amount of the graphite layer is 50 g/m² or less, and the volume resistivity of the graphite is 3 mΩ·cm or less.

10 Claims, 6 Drawing Sheets

(56) References Cited

U.S. PATENT DOCUMENTS

2016/0064746 A1* 3/2016 Iino .................... H01M 8/0213
                                                          429/510
2017/0040621 A1* 2/2017 Hsieh ................. H01M 8/0213
2019/0341630 A1  11/2019 Ando et al.

FOREIGN PATENT DOCUMENTS

| CN | 107819136 A   | 3/2018  |
|----|---------------|---------|
| CN | 108023104 A   | 5/2018  |
| JP | 2006-210222 A | 8/2006  |
| JP | 2006-216257 A | 8/2006  |
| JP | 2007324146 A  | 12/2007 |
| JP | 2008-513971 A | 5/2008  |
| JP | 2009093938 A  | 4/2009  |
| JP | 2009-129601 A | 6/2009  |
| KR | 2012-0093701 A | 8/2012 |
| KR | 2015-0125710 A | 11/2015 |

OTHER PUBLICATIONS

International Search Report dated Jul. 20, 2021 in corresponding International PCT Patent Application PCT/JP2021/019240, 4 pgs.
Extended European Search Report (EESR) dated Sep. 25, 2023 for European Appl. No. 21818788.8.

* cited by examiner

SEPARATOR MEMBER FOR FUEL CELL, AND METHOD FOR MANUFACTURING SAID SEPARATOR MEMBER

TECHNICAL FIELD

The present disclosure relates to a separator member for a fuel cell, and to a method of manufacturing the separator member.

BACKGROUND ART

Examples of characteristics demanded of separator members for fuel cells include conductivity and gas impermeability (also referred to as "gas barrier property"). Examples of materials for improving the conductivity of such separator members for fuel cells include conductive materials such as carbon black, expanded graphite, and natural graphite. Various separator members for fuel cells, using such conductive materials, have been proposed (see, for example, Patent Literature 1).

CITATION LIST

Patent Literature

Patent Literature 1: Unexamined Japanese Patent Application Publication No. 2009-129601

SUMMARY OF INVENTION

Technical Problem

A preforming body included in a separator for a fuel cell, disclosed in Patent Literature 1, includes a structure including an expanded graphite sheet. The expanded graphite sheet has a problem that the strength of the preforming body including the expanded graphite sheet is decreased because the expanded graphite sheet is thick, and the toughness of the expanded graphite sheet is low.

The present disclosure was made under such circumstances with an objective to provide: a separator member for a fuel cell, that includes a graphite layer having a small thickness and is excellent in conductivity; and a method of manufacturing the separator member.

Solution to Problem

As a result of intensive examination for solving the problem described above, the presents inventors found that a separator member for a fuel cell, including a first resin layer including a resin, and a graphite layer that is layered on the first resin layer and substantially made of graphite, wherein the layering amount of the graphite layer is 50 g/m$^2$ or less, and the volume resistivity of the graphite is 3 mΩ·cm or less, enables the problem described above to be solved, and the present disclosure was thus accomplished.

In other words, the present disclosure is as follows.

[1] A separator member for a fuel cell, including: a first resin layer including a resin; and a graphite layer that is layered on the first resin layer and substantially made of graphite, wherein a layering amount of the graphite layer is 50 g/m$^2$ or less, and a volume resistivity of the graphite is 3 ma cm or less.

[2] The separator member according to [1] as described above, wherein a conductive fiber base material and a second resin layer including a resin are layered between the first resin layer and the graphite layer in order in which the conductive fiber base material is closer to the first resin layer than the second resin layer, and a thickness of the second resin layer is smaller than a thickness of the first resin layer.

[3] The separator member according to [1] or [2] as described above, wherein the resin is a thermoplastic resin composition or a thermosetting resin composition.

[4] A method of manufacturing a separator member for a fuel cell, the method including: a first resin layer making step of making a first resin layer including a resin; and a graphite layer making step of making, on the first resin layer, a graphite layer that has a layering amount of 50 g/m$^2$ or less and is substantially made of graphite having a volume resistivity of 3 mΩ·cm or less.

[5] The method according to [4] as described above, wherein the graphite layer making step includes: a graphite sheet layering step of layering a graphite sheet including the graphite on the first resin layer and pressure-bonding the graphite sheet to the first resin layer; and a peeling step of peeling the graphite sheet after the graphite sheet layering step.

[6] The method according to [4] or [5] as described above, wherein the first resin layer making step includes: a resin application step of applying the resin to a film subjected to mold release treatment; and a resin curing step of making the first resin layer in a semi-curing state.

[7] A method of manufacturing a separator member for a fuel cell, the method including: a resin application step of applying a resin to a film subjected to mold release treatment; a first resin layer making step of curing the resin to be in a semi-curing state to make a first resin layer; a graphite sheet layering step of layering a graphite sheet including graphite having a volume resistivity of 3 mΩ·cm or less on the first resin layer and pressure-bonding the graphite sheet to the first resin layer; a film peeling step of peeling the film from the first resin layer; a second graphite sheet layering step of layering a graphite sheet including graphite having a volume resistivity of 3 mΩ·cm or less on a face of the first resin layer from which the film is peeled and pressure-bonding the graphite sheet to the face; and a peeling step of peeling the graphite sheets from both faces of the first resin layer.

[8] A method of manufacturing a separator member for a fuel cell, the method including: a first resin layer making step of making a first resin layer including a resin; a second resin layer making step of making a second resin layer in a semi-curing state, including a resin and having a thickness that is smaller than a thickness of the first resin layer; a conductive fiber base material layering step of layering a conductive fiber base material on the second resin layer and pressure-bonding the conductive fiber base material to the second resin layer by heating; a graphite layer making step of making a graphite layer that has a layering amount of 50 g/m$^2$ or less, and is substantially made of graphite having a volume resistivity of 3 mΩ·cm or less on a resin face of the second resin layer, on which the conductive fiber base material is layered; and a first resin layer layering step of layering the first resin layer on the conductive fiber base material of the second resin layer, and heating and pressurizing the first resin layer.

[9] The method according to [8] as described above, wherein the first resin layer making step includes: a resin application step of applying the resin to a film subjected to mold release treatment; and a resin curing step of making the first resin layer in a semi-curing state.

[10] The method according to [8] or [9] as described above, wherein the second resin layer making step includes:

a second resin application step of applying the resin to a film subjected to mold release treatment; and a second resin curing step of making the second resin layer in a semi-curing state.

[11] The method according to any one of [8] to [10] as described above, wherein the graphite layer making step includes: a graphite sheet layering step of layering a graphite sheet including the graphite on a resin face of the second resin layer, on which the conductive fiber base material is layered, and pressure-bonding the graphite sheet to the resin face; and a peeling step of peeling the graphite sheet after the graphite sheet layering step.

Advantageous Effects of Invention

In accordance with the present disclosure, there can be provided: a separator member for a fuel cell, that includes a graphite layer having a small thickness and is excellent in conductivity; and a method of manufacturing the separator member.

DESCRIPTION OF EMBODIMENTS

A separator member for a fuel cell according to each embodiment of the present disclosure, and a method of manufacturing the separator member are described in detail below. The following embodiments merely exemplify the present disclosure, and are not intended to limit the present disclosure to the following contents. The present disclosure may be appropriately modified and carried out within the scope of the gist of the present disclosure.

The separator member for a fuel cell of the present disclosure is preferably used as a member for a separator included in a fuel cell. The separator member for a fuel cell in the present disclosure refers to a member before the member is worked into a separator for a fuel cell.

Embodiment 1

(Configuration of Separator Member 10 for Fuel Cell)

A separator member 10 for a fuel cell of Embodiment 1 includes a first resin layer including a resin, and a graphite layer that is layered on the first resin layer, and substantially made of graphite, wherein the layering amount of the graphite layer is 50 g/m$^2$ or less, and the volume resistivity of the graphite is 3 mΩ·cm or less.

Figure 1:
FIG. 1 is a schematic cross-sectional view illustrating the structure of a separator member for a fuel cell of Embodiment 1.
Figure 2A:
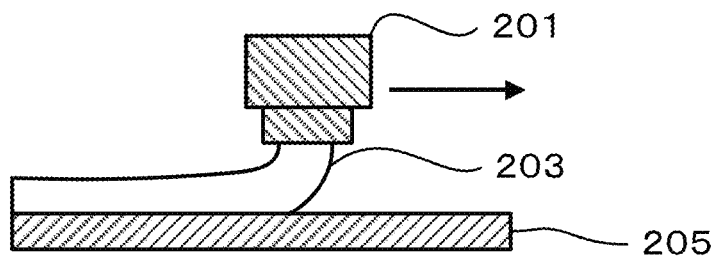
FIG. 2 is a view for explaining steps of manufacturing the separator member for a fuel cell of Embodiment 1, in which a section (a) is a view for explaining a step of applying a resin included in a first resin layer, a section (b) is a view for explaining a step of drying the first resin layer, a section (c) is a view for explaining a step of layering graphite sheets on both faces of the first resin layer, and a section (d) is a view for explaining a step of peeling the graphite sheets from the both faces of the first resin layer to make a layered body.
Figure 2B:
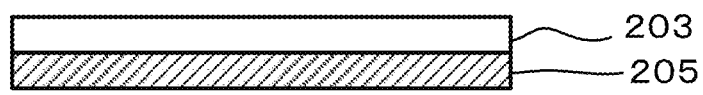
Figure 2C:
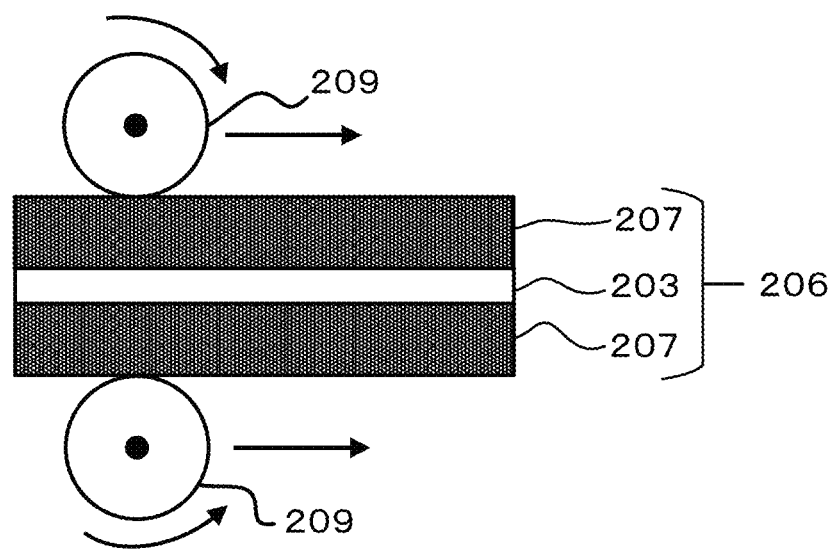
Figure 2D:
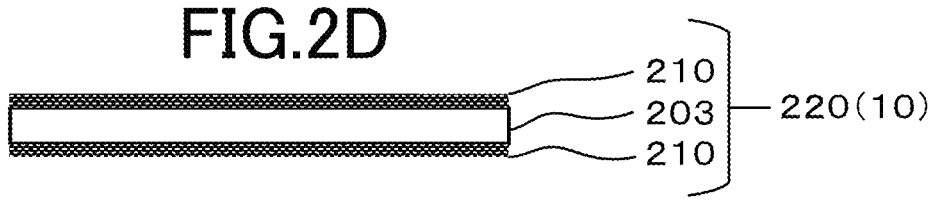

FIG. 1 is a schematic cross-sectional view illustrating the separator member 10 for a fuel cell. The separator member 10 for a fuel cell includes a configuration in which graphite layers 11 are layered on both faces of a first resin layer 13.

The first resin layer 13 includes a resin. The kind of the resin is not particularly limited as long as the first resin layer 13 of the separator member for a fuel cell can be made of the resin, and the resin enables the separator member for a fuel cell to be worked into a separator for a fuel cell. Examples of the resin include a thermosetting resin composition or a thermoplastic resin composition.

Examples of the thermosetting resin composition include an epoxy-based resin composition containing epoxy resin as a main agent, a phenol-based resin composition containing a phenol resin as a main agent, a polyimide-based resin composition containing a thermosetting polyimide resin as a main agent, a melamine-based resin composition containing a melamine resin as a main agent, a urethane-based resin composition containing a urethane resin as a main agent, a diallyl phthalate-based resin composition containing a diallyl phthalate resin as a main agent, an unsaturated polyester-based resin composition containing an unsaturated polyester resin as a main agent, and a cyanate ester-based resin composition containing as a cyanate ester resin as a main agent. Such an epoxy-based resin composition is preferred from the viewpoint of heat resistance, durability, and workability, as well as adhesion between the first resin layer 13 and the graphite layers 11.

Examples of the thermoplastic resin composition include an acrylic-based resin composition containing an acrylic resin as a main agent, a polyacrylonitrile-based resin composition containing a polyacrylonitrile resin as a main agent, a polyimide-based resin composition containing a thermoplastic polyimide resin as a main agent, a polyamide-based resin composition containing a polyamide resin as a main agent, a polyethersulfone-based resin composition containing a polyethersulfone resin as a main agent, a phenoxy-based resin composition containing a phenoxy resin as a main agent, a polypropylene-based resin composition containing a polypropylene resin as a main agent, a polycarbonate-based resin composition containing a polycarbonate resin as a main agent, a polyethylene-based resin composition containing a polyethylene resin as a main agent, a polyester-based resin composition containing a polyester resin as a main agent, an acrylonitrile-butadiene-styrene-based resin composition containing an acrylonitrile-butadiene-styrene (ABS) resin as a main agent, a polystyrene-based resin composition containing a polystyrene (PS) resin as a main agent, a polyphenylene sulfide-based resin composition containing a polyphenylene sulfide (PPS) resin composition as a main agent, and a polyamide-imide-based resin composition containing a polyamide-imide (PAI) resin as a main agent. The polyethersulfone-based resin composition and the polypropylene-based resin composition are preferred from the viewpoint of heat resistance, durability, and workability, as well as adhesion between the first resin layer 13 and the graphite layers 11.

A conductive material may be added to the resin of the first resin layer 13 from the viewpoint of increasing the conductivity of the separator member 10 for a fuel cell. Examples of the conductive material include artificial graphite, natural graphite, carbon black, carbon fiber, and carbon nanotube (CNT). Use of artificial graphite and/or natural graphite is preferred from the viewpoint of conductivity and a cost.

Assuming that the total mass of the resin is 100 parts by mass on a solid content basis, the amount of added conductive material is preferably 40 to 90 parts by mass, more preferably 60 to 90 parts by mass, and still more preferably 60 to 85 parts by mass from the viewpoint of workability.

The thickness of the first resin layer 13 is preferably 100 to 800 µm, depending on the thickness of the separator for a fuel cell itself, and is 100 to 700 µm from the viewpoint of thinness and workability.

The graphite included in the graphite layers 11 is not particularly limited, and is preferably natural graphite from the viewpoint of reducing a volume resistivity to a low level. The graphite is more preferably expanded graphite from the viewpoint of enabling the graphite layer having a uniform and small thickness to be made.

The volume resistivity of the graphite is preferably 3 mΩ·cm or less, and more preferably 1 mΩ·m or less, from the viewpoint of securing the conductivity of the separator for a fuel cell.

The layering amount of each of the graphite layers 11 is 50 g/m² or less, preferably 0.3 to 50 g/m², and more preferably 0.5 to 30 g/m², from the viewpoint of thinness and workability.

The thickness of each of the graphite layers 11 is preferably 0.1 µm or more and 50 µm or less from the viewpoint of conductivity and workability. The thickness of each of the graphite layers 11 is more preferably 0.2 µm or more and 15 µm or less from the viewpoint of conductivity and thinning. The thickness of each of the graphite layers 11 refers to the thickness of the graphite layer after the separator member 10 for a fuel cell has been worked into a separator for a fuel cell.

The graphite layers 11 are substantially made of graphite. The phrase "substantially made of graphite" refers to a state in which the amount of nonconductive material present in each of the graphite layers 11 is small enough for the conductivity of the separator member 10 for a fuel cell to be prevented from being inhibited. Specifically, the phrase "substantially made of graphite" refers to a state in which a material included in each of the graphite layers 11 includes 95% by weight or more of graphite having a volume resistivity of 3 mΩ·cm or less.

The separator member 10 for a fuel cell of Embodiment 1 is described by taking, as an example, the configuration in which the graphite layers 11 are layered on the both faces of the first resin layer 13. However, a separator member 10 for a fuel cell may include a configuration in which a graphite layer 11 is layered only on one face of the first resin layer 13.

In another configuration of a separator member 10 for a fuel cell, another layer may be layered between a first resin layer 13 and a graphite layer 11. The other layer may be a single layer or a multilayer. For example, in the case of the single layer, a resin included in the single layer may be the same as or different from the resin of the first resin layer 13. When the resin included in the single layer is different from the resin included in the first resin layer 13, the resin included in the first resin layer 13 includes a thermoplastic resin composition, and the other layers include a thermosetting resin composition. As a result, followability to a mold in a case in which the separator member 10 for a fuel cell is worked into a separator for a fuel cell is improved.

(Method of Manufacturing Separator Member 10 for Fuel Cell)

A method of manufacturing a separator member 10 for a fuel cell includes: a first resin layer making step of making a first resin layer 13 including a resin; and a graphite layer making step of making, on the first resin layer 13, a graphite layer 11 that has a layering amount of 50 g/m² or less and is substantially made of graphite having a volume resistivity of 3 mΩ·cm or less. The first resin layer making step includes: a resin application step of applying the resin to a film subjected to mold release treatment; and a resin curing step of the first resin layer 13 in a semi-curing state. The graphite layer making step includes: a graphite sheet layering step of layering a graphite sheet including the graphite on the first resin layer 13 and pressure-bonding the graphite sheet to the first resin layer 13; and a peeling step of peeling the graphite sheet from the first resin layer 13 after the graphite sheet layering step.

FIG. 2 is a view for explaining the method of manufacturing the separator member 10 for a fuel cell. The resin application step is described with reference to the section (a) of FIG. 2. An application apparatus 201 applies a resin included in a first resin layer 203 to a mold-release-treated face of a film 205 subjected to mold release treatment. At least one face of the film 205 is preferably subjected to mold release treatment. The film 205 is not particularly limited as long as the film 205 can be peeled from the first resin layer 203 that has been cured. Examples of the material of the film 205 include plastics such as polyethylene terephthalate, polyethylene, and polypropylene, and paper. Examples of a material used in the mold release treatment include silicone-based materials and fluorine-based materials. A known application apparatus can be adopted as the application apparatus 201, which is not particularly limited. For example, a die coater, a comma coater, a gravure coater, or the like can be used. Examples of a method of the application include: a method in which the application apparatus 201 is moved to apply the resin to the film 205 as illustrated in the section (a) of FIG. 2; and a method in which the film 205 is moved to apply the resin.

The resin curing step is described with reference to the section (b) of FIG. 2. The first resin layer 203 becomes in a semi-curing state (B-stage state) by drying the first resin layer 203. A drying machine is used for the drying. The first resin layer 203 is preferably heated to dry the first resin layer 203. Heat drying conditions can be selected depending on the thickness of the first resin layer 203, as appropriate. For example, the heat drying conditions are 40 to 200° C. and 1 to 120 minutes. The surfaces of the first resin layer 203 that has been dried may have tackiness (stickiness). As a result, adhesion between the first resin layer 203 and graphite sheets 207 used in the subsequent graphite sheet layering step becomes favorable. In such a case, the semi-curing state (also referred to as "B-stage state") refers to a state in which the curing reaction of the resin does not completely proceed. Hereinafter, "semi-curing state" as used herein is used as having a meaning similar thereto.

The thickness of the first resin layer 203 is preferably 100 μm or more from the viewpoint of improving shape followability to a mold for molding into a separator for a fuel cell, and of securing a uniform thickness. For example, when the thickness of the separator member for a fuel cell is some hundreds of micrometers, two first resin layers 203 of 100 μm can be produced to affix resin faces of the first resin layers 203 to each other to obtain the first resin layer 203 having a thickness of 200 by way of example. By way other example, three or more first resin layers 203 having a thickness of 50 to 100 μm can be produced, layered, and affixed to obtain the first resin layer 203 having a thickness of some hundreds of micrometers.

The graphite sheet layering step is described with reference to the section (c) of FIG. 2. The film 205 is peeled from the first resin layer 203 in the semi-curing state. The graphite sheets 207 are layered on both faces of the first resin layer 203, and the graphite sheets 207 are pressure-bonded to the faces by rollers 209. The rollers 209 are moved in the face direction of a layered body 206. The pressure-bonding by the rollers may be achieved by moving the layered body 206. After the pressure-bonding, the layered body 206 is obtained. Pressurization may be performed at ordinary temperature for the pressure-bonding, and the pressure-bonding may be performed while performing heating from the viewpoint of improving the adhesion between the first resin layer 203 and the graphite sheets 207.

In addition to the method using the rollers 209, for example, a method using a pressing machine is also acceptable. For pressure-bonding, pressurization may be performed at ordinary temperature, or pressurization may be performed while heating is performed. The conditions of the heating and the pressurization can be selected as appropriate depending on the thicknesses of the graphite sheets 207 and on the thickness of the first resin layer 203. For example, conditions of 20 to 200° C. and 0.1 to 20 MPa are possible.

In the graphite sheet layering step, the graphite sheets 207 may be separately layered on the both faces of the first resin layer 203, and the graphite sheets 207 may be separately pressure-bonded to the faces. For example, one graphite sheet 207 is layered on the resin face of the first resin layer 203 that has been subjected to the resin curing step, and the graphite sheet 207 is pressure-bonded to the resin face. Then, the film 205 may be peeled to layer the other graphite sheet 207 on the exposed resin face of the first resin layer 203 and to pressure-bond the graphite sheet 207 to the resin face.

Examples of the graphite sheets 207 include: a natural graphite sheet obtained by molding natural graphite in a sheet shape using neither a binding material nor an additive; and an artificial graphite sheet obtained by burning an organic film such as polyimide. The natural graphite sheet refers to a graphite sheet obtained by acid-treating natural graphite, rapidly heating the natural graphite until the natural graphite becomes in a high-temperature (for example, 900 to 1000° C.) state, and compressively processing the expanded natural graphite. From the viewpoint of decreasing a volume resistivity and uniformalizing a layering amount, the graphite sheets 207 used are preferably natural graphite sheets.

The peeling step is described with reference to the section (d) of FIG. 2. A method of peeling the graphite sheets 207 is preferably a peeling method in which the graphite sheets 207 are preferably peeled from the layered body 206, followed by making graphite layers 210 on the surfaces of the first resin layer 203. Examples thereof include a method in which the graphite sheets 207 are peeled so that only the graphite sheets 207 are stripped off from an end of the layered body 206. The graphite sheets 207 are peeled from the layered body 206, and then, the graphite layers 210 that each have a layering amount of 50 g/m$^2$ or less and are substantially made of graphite having a volume resistivity of 3 mΩ·cm or less are made on the both surfaces of the first resin layer 203. A layered body 220 in which the graphite layers 210 are made corresponds to the separator member 10 for a fuel cell. The graphite layers 210 correspond to the graphite layers 11 of the separator member 10 for a fuel cell, illustrated in FIG. 1. The first resin layer 203 corresponds to the first resin layer 13. The graphite sheets 207 peeled from the first resin layer 203 can be used plural times unless the graphite sheets 207 are broken.

In another method of making the graphite layers 210, the graphite sheets 207 may be wound and fixed around the outer peripheral faces of the rollers, and the rollers may be pressed against the first resin layer 203 to make the graphite layers 210. According to this method, the first resin layer making step and the graphite layer making step can be unified in a single line, and the separator member 10 for a fuel cell can be continuously manufactured.

Examples of other methods of making the first resin layer 203 include a method in which a solventless-type resin of which the viscosity is adjusted is stretched in a film shape to make the first resin layer 203; and a method in which fibrous resins are deposited on a film-shaped base material by a sheet making method to make the first resin layer 203. According to these methods, working is facilitated because the first resin layer 203 includes no solvent.

Examples of another method of manufacturing the separator member 10 for a fuel cell include a method including: an affixing step of affixing a graphite sheet and adhesive faces of self-adhesive films to each other; a step of preparing self-adhesive films with graphite layers, in which the self-adhesive films are peeled from the graphite sheet to obtain the self-adhesive films with graphite layers; a first resin layer making step of making a first resin layer including a resin; a layering pressure-bonding step of layering the graphite layers of the self-adhesive films with the graphite layers on both faces of the first resin layer obtained in the first resin layer making step so that the graphite layers come into contact with the faces, and pressure-bonding the graphite layers to the faces; and a peeling step of peeling the self-adhesive films from a layered body obtained in the layering pressure bonding step. According to this manufacturing method, the separator member 10 for a fuel cell can be manufactured without changing the shape of the first resin layer even when the first resin layer is easily broken, or even when it is difficult to handle the first resin layer.

A method of manufacturing a separator member 10 for a fuel cell in which a graphite layer 11 is made on one face of a first resin layer 13 includes, for example: a resin application step of applying a resin to a film subjected to mold release treatment; a resin curing step of making a first resin layer in a semi-curing state; a graphite sheet layering step of layering a graphite sheet including graphite on the first resin layer and pressure-bonding the graphite sheet to the first resin layer; and a peeling step of peeling the graphite sheet after the graphite sheet layering step. As a result, the separator member 10 for a fuel cell, in which the graphite layer 11 is made on the one face of the first resin layer 13, can be obtained. The separator member 10 for a fuel cell, in which the graphite layer 11 is made on the one face of the first resin layer 13, can be manufactured by applying another method, without limitation to the exemplified method.

In accordance with the configuration of the separator member 10 for a fuel cell, neither recesses nor projections caused by swelling are present on a surface of the separator for a fuel cell after the separator member 10 for a fuel cell is worked into a separator for a fuel cell. Further, working of the separator member 10 for a fuel cell into the separator for a fuel cell is facilitated. Mechanisms, by which the separator for a fuel cell is not swollen and the separator member 10 for a fuel cell is excellent in workability, and which is presumed by the present inventors, are described.

The graphite layers 11, viewed from the above of the graphite layers 11 of the separator member 10 for a fuel cell, are in a state in which graphite is irregularly arranged. The state is presumed to be made when the graphite sheets are peeled. The irregular arrangement of the graphite is considered to be also caused by the shape of the graphite. The shape of the graphite is a flake shape having a principal face. Such a shape allows a certain graphite to be in a state in which the principal face of the graphite is arranged substantially in parallel to the XY plane (principal plane of graphite layer) on a surface of each of the graphite layers. Another certain graphite is in a state in which the principal face of the graphite is perpendicular to the XY plane. Another certain graphite is in a state in which the principal face of the graphite is inclined with respect to the XY plane, that is, in a state in which the principal face of the graphite is at an angle with respect to the XY plane. In such a manner, graphites of which the principal faces are oriented in various directions coexist on the surface of each of the graphite layers 11. Further, gas generated in the case of curing the first resin layers is released in an open manner without remaining between the graphite layers 11 and the first resin layer 13 by combination with such irregular arrangement of graphite and the small thicknesses of the graphite layers 11. As a result, swelling is presumed to be prevented from occurring in the separator member for a fuel cell.

Further, the graphite included in the graphite layers 11 has mold release characteristics, and therefore, it is not necessary to use a mold release agent that facilitates unmolding between the separator member 10 for a fuel cell and a mold for molding. Since the need for the mold release agent is eliminated as described above, the deterioration of the hydrophilicity of the separator itself for a fuel cell, caused by the mold release agent, can be also suppressed.

Further, regions in which the graphite and the resin included in the first resin layer 13 coexist are made on interfaces between the graphite layers 11 and the first resin layer 13, and in the vicinities of the interfaces, by the pressure-bonding in the manufacturing process. As a result, adhesion between the graphite layers 11 and the first resin layer 13 is presumed to be improved.

Embodiment 2

(Configuration of Separator Member 30 for Fuel Cell)

A separator member 30 for a fuel cell in Embodiment 2 includes: a first resin layer including a resin; and a graphite layer substantially made of graphite. A conductive fiber base material and a second resin layer including a resin are layered between the first resin layer and the graphite layer in order in which the conductive fiber base material is closer to the first resin layer than the second resin layer. The thickness of the second resin layer is smaller than the thickness of the first resin layer. The layering amount of the graphite layer is 50 g/m² or less, and the volume resistivity of the graphite is 3 ma cm or less.

Figure 3:
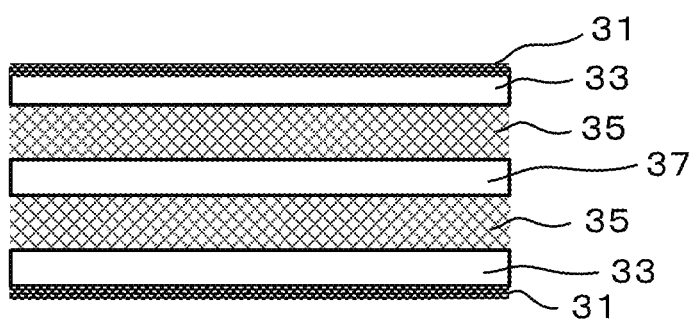
FIG. 3 is a schematic cross-sectional view illustrating the structure of a separator member for a fuel cell of Embodiment 2.

FIG. 3 is a schematic cross-sectional view illustrating an example of the separator member 30 for a fuel cell in Embodiment 2. The separator member 30 for a fuel cell has a configuration in which conductive fiber base materials 35, second resin layers 33, and graphite layers 31 are layered on both faces of a first resin layer 37 in order in which the conductive fiber base materials 35 are closer to the first resin layer 37 than the second resin layers 33, and the second resin layers 33 are closer to the first resin layer 37 than the graphite layers 31.

The first resin layer 37 has the same configuration as the configuration of the first resin layer 13 of the separator member 10 for a fuel cell.

The second resin layers 33 include a resin. The kind of the resin is not particularly limited. Examples of the resin include a thermosetting resin composition or a thermoplastic resin composition.

Examples of the thermosetting resin composition include an epoxy-based resin composition containing an epoxy resin as a main agent, a phenol-based resin composition containing a phenol resin as a main agent, a polyimide-based resin composition containing a thermosetting polyimide resin as a main agent, a melamine-based resin composition containing a melamine resin as a main agent, a urethane-based resin composition containing a urethane resin as a main agent, a diallyl phthalate-based resin composition containing a diallyl phthalate resin as a main agent, an unsaturated polyester resin composition containing an unsaturated polyester resin as a main agent, and a cyanate ester-based resin composition containing a cyanate ester resin as a main agent. The epoxy-based resin composition is preferred from the viewpoint of heat resistance, durability, and workability.

Examples of the thermoplastic resin composition include an acrylic-based resin composition containing an acrylic resin as a main agent, a polyacrylonitrile-based resin composition containing a polyacrylonitrile resin as a main agent, a polyimide-based resin composition containing a thermoplastic polyimide resin as a main agent, a polyamide-based resin composition containing a polyamide resin as a main agent, a polyethersulfone-based resin composition containing a polyethersulfone resin as a main agent, a phenoxy-based resin composition containing a phenoxy resin as a main agent, a polypropylene-based resin composition containing a polypropylene resin as a main agent, a polycarbonate-based resin composition containing a polycarbonate resin as a main agent, a polyethylene-based resin composition containing a polyethylene resin as a main agent, a polyester-based resin composition containing a polyester resin as a main agent, an acrylonitrile-butadiene-styrene-based resin composition containing an acrylonitrile-butadiene-styrene (ABS) resin as a main agent, a polystyrene-based resin composition containing a polystyrene (PS) resin as a main agent, a polyphenylene sulfide-based resin composition containing a polyphenylene sulfide (PPS) resin composition as a main agent, and a polyamide-imide-based resin composition containing a polyamide-imide (PAD resin as a main agent. The polyethersulfone-based resin composition and the polypropylene-based resin composition are preferred from the viewpoint of heat resistance, durability, and workability.

The resin included in the second resin layers 33 may be the same as a resin included in the first resin layer 37, or may be different from the resin included in the first resin layer 37. From the viewpoint of holding the shape of a separator for a fuel cell without allowing the second resin layers 33 closer to surface layers to be deformed by heat, it is preferable that the resin included in the first resin layer 37 is a thermoplastic resin composition, and the resin included in the second resin layers 33 is a thermosetting resin composition.

The resin included in the second resin layers 33 may contain a conductive material from the viewpoint of enhancing the conductivity of the separator member 30 for a fuel cell. Examples of the conductive material include artificial graphite, natural graphite, carbon black, carbon fibers, and a carbon nanotube (CNT). The artificial graphite and/or the natural graphite are preferably used from the viewpoint of conductivity and a cost. The second resin layers 33 may include conductive short fibers.

The thickness of each of the second resin layers 33 is smaller than the thickness of the first resin layer 37. The thickness is preferably 3 to 100 μm, and is 5 to 50 μm from the viewpoint of thinness and workability.

The graphite layers 31 are substantially made of graphite. The phrase "substantially made of graphite" refers to a state in which the amount of nonconductive material present in each of the graphite layers 31 is small enough for the conductivity of the separator member 30 for a fuel cell to be prevented from being inhibited. Specifically, the phrase "substantially made of graphite" refers to a state in which a material included in each of the graphite layers 31 includes 95% by weight or more of graphite having a volume resistivity of 3 mΩ·cm or less.

The conductive fiber base materials 35 are not particularly limited as long as each of the conductive fiber base materials 35 has a sheet shape and is a fiber material having conductivity. Short fibers having conductivity and non-woven fabrics both having conductivity are preferred from the viewpoint of enhancing the strength and elastic modulus of the separator member 30 for a fuel cell. Fibers included in the non-woven fabrics may be not only a single kind of fibers but also several kinds of fibers. Examples of the short fibers and the fibers included in non-woven fabrics include carbon fibers, glass fibers, chemical fibers such as polyester, and fibers derived from minerals such as alumina and silica. Carbon fibers, polyester fibers, and polyphenylene sulfide (PPS) fibers are preferred from the viewpoint of heat resistance and chemical resistance. A non-woven fabric including carbon fibers is further preferred from the viewpoint of allowing the conductivity of the separator member 30 for a fuel cell to be favorable and enhancing the elastic modulus of the separator member 30 for a fuel cell.

The conductive fiber base materials 35 included in the separator member 30 for a fuel cell are located at positions closer to the surface layers than the first resin layer 37, whereby a separator itself for a fuel cell can be inhibited from cracking when the separator member 30 for a fuel cell is worked into the separator for a fuel cell, or when a fuel cell is used.

The weight of each of the conductive fiber base materials 35 is preferably 5 to 200 g/m$^2$, and more preferably 5 to 50 g/m$^2$, from the viewpoint of workability.

The separator member 30 for a fuel cell may has, as another configuration, a configuration in which a conductive fiber base material 35, a second resin layer 33, and a graphite layer 31 are layered only on one face of the first resin layer 37 in order in which the conductive fiber base material 35 is closer to the first resin layer 37 than the second resin layer 33, and the second resin layer 33 is closer to the first resin layer 37 than the graphite layer 31.

(Method of Manufacturing Separator Member 30 for Fuel Cell)

A method of manufacturing a separator member 30 for a fuel cell includes: a first resin layer making step of making a first resin layer including a resin; a second resin layer making step of making a second resin layer in a semi-curing state, including a resin and having a thickness that is smaller than the thickness of the first resin layer; a conductive fiber base material layering step of layering a conductive fiber base material on the second resin layer and pressure-bonding the conductive fiber base material to the second resin layer by heating; a graphite layer making step of making a graphite layer that has a layering amount of 50 g/m$^2$ or less, and is substantially made of graphite having a volume resistivity of 3 mΩ·cm or less on a resin face of the second resin layer, on which the conductive fiber base material is layered; and a first resin layer layering step of layering the first resin layer on the conductive fiber base material of the second resin layer, and heating and pressurizing the first resin layer. The first resin layer making step includes: a resin application step of applying the resin to a film subjected to mold release treatment; and a resin curing step of making the first resin layer in a semi-curing state. The second resin layer making step includes: a second resin application step of applying the resin to a film subjected to mold release treatment; and a second resin curing step of making the second resin layer in a semi-curing state. The graphite layer making step includes: a graphite sheet layering step of layering a graphite sheet including the graphite on a resin face of the second resin layer, on which the conductive fiber base material is layered, and pressure-bonding the graphite sheet to the resin face; and a peeling step of peeling the graphite sheet after the graphite sheet layering step.

Figure 4A:
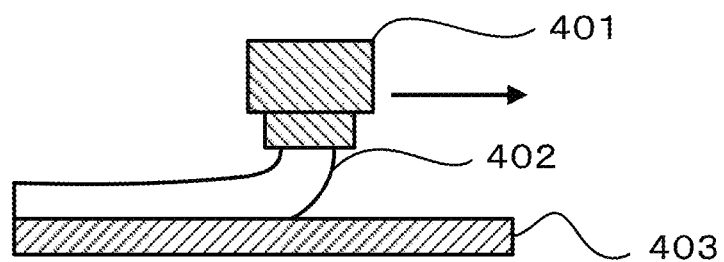
FIG. 4A is a view for explaining steps of manufacturing the separator member for a fuel cell of Embodiment 2, in which a section (a) is a view for explaining a step of applying a resin included in a first resin layer, a section (a-1) is a view for explaining a step of drying the first resin layer, a section (b) is a view for explaining a step of applying a resin included in a second resin layer, and a section (b-1) is a view for explaining a step of drying the resin.
Figure 4A:
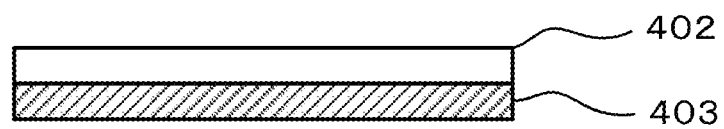
Figure 4A:
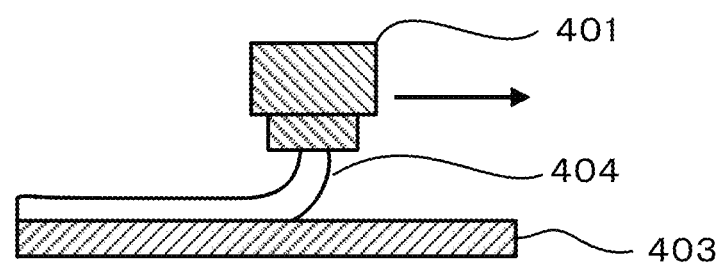
Figure 4A:
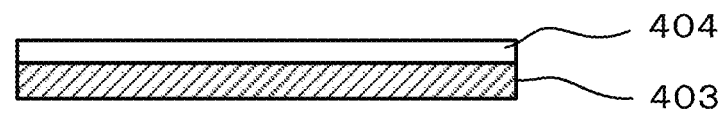
Figure 4B:
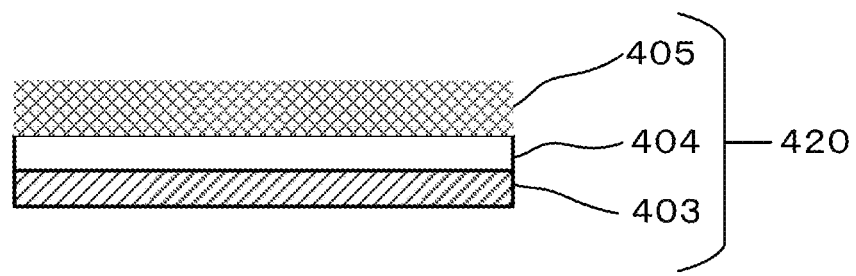
FIG. 4B is a view for explaining steps of manufacturing the separator member for a fuel cell of Embodiment 2, in which a section (c) is a view for explaining a step of layering a conductive fiber base material on the second resin layer and pressure-bonding the conductive fiber base material to the second resin layer, a section (d) is a view for explaining a step of layering a graphite sheet on the second resin layer obtained in the step (c) and pressure-bonding the graphite sheet to the second resin layer, and a section (e) is a view for explaining a step of layering the first resin layer on the conductive fiber base material of the second resin layer and pressure-bonding the first resin layer to the conductive fiber base material.
Figure 4B:
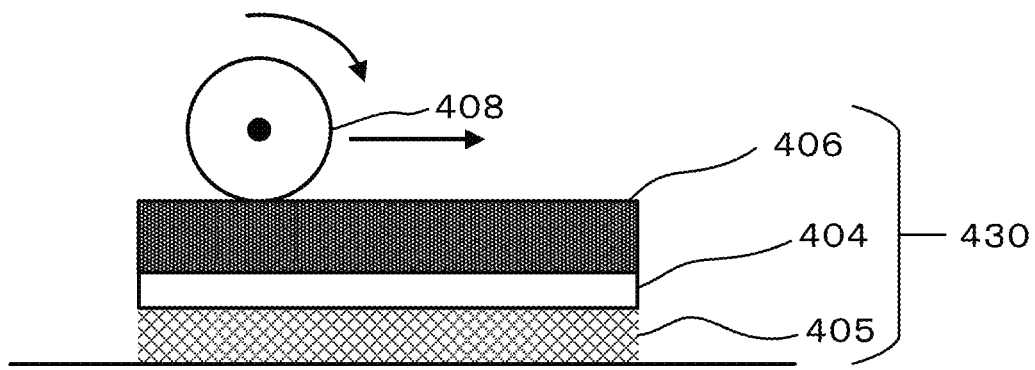
Figure 4B:
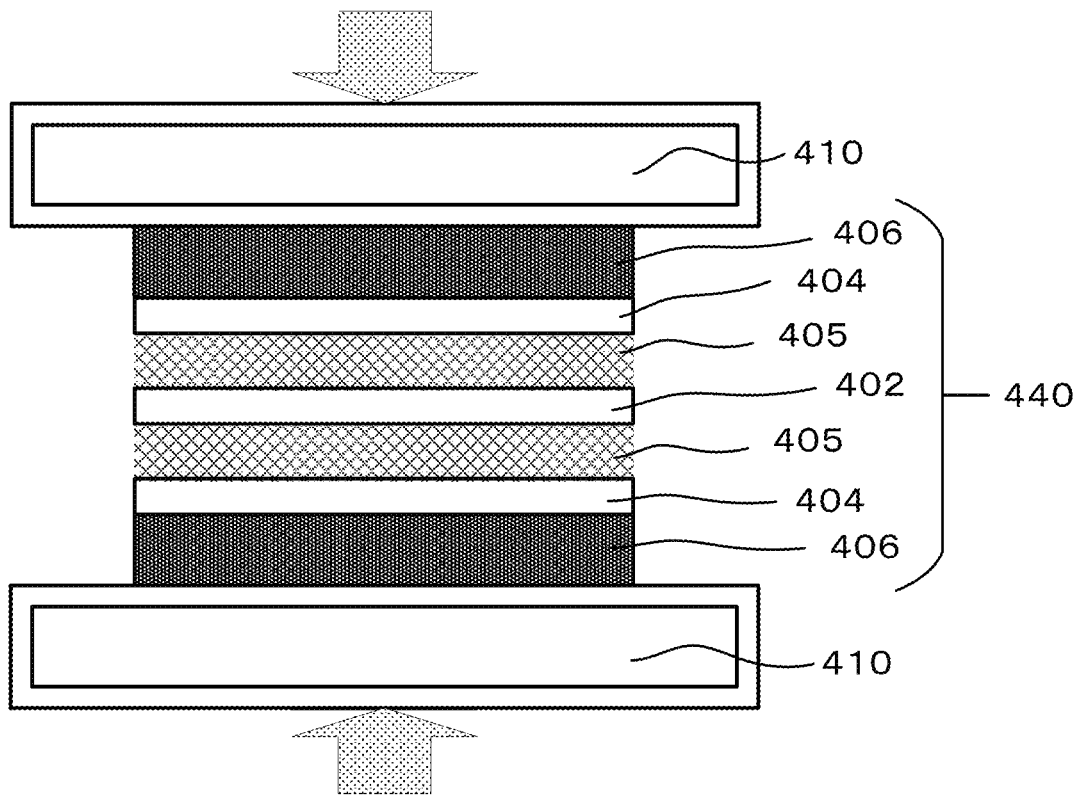
Figure 4C:
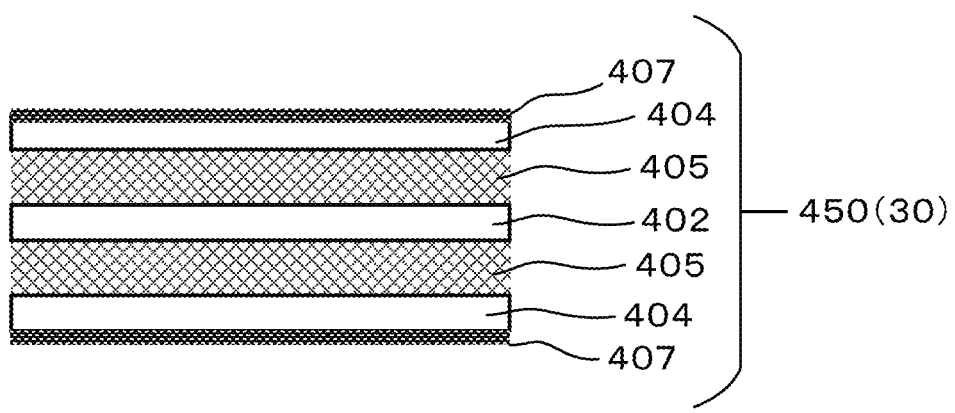
FIG. 4C is a view for explaining a step of manufacturing the separator member for a fuel cell of Embodiment 2, in which a section (f) is a view for explaining the step of peeling the graphite sheet from a layered body.

FIGS. 4A to 4C are views for describing the method of manufacturing the separator member 30 for a fuel cell.

The resin application step is described with reference to the section (a) of FIG. 4A. An application apparatus 401 applies a resin included in a first resin layer 402 to a mold-release-treated face of a film 403 subjected to mold release treatment. The same film as the film 205 used in Embodiment 1 can be used as the film 403. The same application apparatus as the application apparatus 201 used in Embodiment 1 can be used as the application apparatus 401.

The resin curing step is described with reference to the section (a-1) of FIG. 4A. The first resin layer 402 is preferably dried by heating the first resin layer 402 using a drying machine. Heat drying conditions can be selected depending on the thickness of the first resin layer 402, as appropriate. For example, the heat drying conditions are 40 to 200° C. and 1 to 120 minutes. The first resin layer 402 that has been dried is in a semi-curing state (B-stage state). Like the first resin layer 203, a surface of the resin included in the first resin layer 402 may have tackiness.

The second resin application step is described with reference to the section (b) of FIG. 4A. An application apparatus 409 applies a resin included in a second resin layer 404 to the mold-release-treated face of the film 403 subjected to the mold release treatment. The same application apparatus as the application apparatus 401 in the resin application step can be used as the application apparatus 409.

The second resin curing step is described with reference to the section of (b-1) of FIG. 4A. The second resin layer 404 is preferably heated and dried using a drying machine. Heat drying conditions can be selected depending on the thickness of the second resin layer 404, as appropriate. For example, the heat drying conditions are 40 to 200° C. and 1 to 120 minutes. The second resin layer 404 that has been dried is in a semi-curing state (B-stage state). From the viewpoint of allowing the conductivity of a separator for a fuel cell to be favorable and enhancing the elastic modulus of the separator for a fuel cell, it is preferable that the thickness of the second resin layer 404 that has been dried is smaller than the thickness of the first resin layer 402. Like the first resin layer 402, a surface of the resin included in the second resin layer 404 may have tackiness.

The conductive fiber base material layering step is described with reference to the section (c) of FIG. 4B. In a layered body 420, a conductive fiber base material 405 is layered on a resin face of the second resin layer 404 layered on the film 403. The layered body 420 is heated and pressurized by a pressing machine. The layered body 420 may be pressurized at ordinary temperature. The conditions of the heating and the pressurization can be selected depending on the thickness of the conductive fiber base material 405 and on the thickness of the second resin layer 404, as appropriate. For example, the conditions of the heating and the pressurization are 20 to 350° C. and 0.1 to 50 MPa. Pressure-bonding may be performed using a roller instead of the pressing machine. The condition of the pressure-bonding may be a pressure at which the conductive fiber base material 405 brings into intimate contact with the surface of the second resin layer 404. The pressure-bonding with heating is also acceptable. For example, conductive short fibers including carbon fibers, instead of the conductive fiber base material 405, may be uniformly sprinkled on the surface of the second resin layer 404, and may be then pressed against the surface.

The graphite sheet layering step is described with reference to the section (d) of FIG. 4B. The film 403 is peeled from the layered body 420, and a graphite sheet 406 is layered on the resin face of the second resin layer 404. Then, the pressure-bonding is performed from the graphite sheet 406 by a roller 408. When the graphite sheet 406 that has been pressure-bonded is peeled from the resin face of the second resin layer 404, the pressure-bonding is preferably performed at a pressure at which a graphite layer is made. From the viewpoint of enhancing adhesion between the second resin layer 404 and the graphite sheet 406, the pressure-bonding may be performed while heating. The conditions of the pressure-bonding can be selected, as appropriate, depending on the thickness of the graphite sheet 406 and on the thickness of the second resin layer 404. For example, the conditions are 20 to 350° C. and 0.1 to 50 MPa. In addition to the method using the roller 408, for example, the pressurization may be performed with a pressing machine, or the pressurization may be performed while heating.

The first resin layer layering step is described with reference to the section (e) of FIG. 4B. The first resin layer 402 from which the film 403 is peeled is layered on a surface of the conductive fiber base material 405 included in a layered body 430. Another layered body 430 is layered on a resin face of the first resin layer 402 so that a conductive fiber base material 405 comes in contact with the resin face, and the layered bodies 430 are heated and pressurized with pressing machines 410. As a result, a layered body 440 in which the first resin layer 402 is layered on the conductive fiber base materials 405 is obtained. The conditions of the heating and the pressurization can be selected depending on the thickness of the layered body 440, as appropriate. For example, the conditions are 20 to 350° C. and 0.1 to 50 MPa.

The peeling step is described with reference to the section (f) of FIG. 4C. In the peeling step in the method of manufacturing the separator member 30 for a fuel cell, the graphite sheets 406 can be peeled by the same process as the peeling step in the method of manufacturing the separator member 10 for a fuel cell. For example, only the graphite sheets 406 are peeled so as to be stripped off from an end of the layered body 440. The peeling of the graphite sheets 406 from the second resin layers 404 allows graphite that is part of the graphite sheets 406 to remain in the second resin layers 404, and graphite layers 407 to be made to obtain a layered body 450. The graphite sheets 406 may be peeled before the layered body 440 is heated and pressurized. In such a case, the first resin layer 402 corresponds to the first resin layer 37 of the separator member 30 for a fuel cell shown in FIG. 3. The conductive fiber base materials 405 correspond to the conductive fiber base materials 35. The second resin layers 404 correspond to the second resin layers 33. The graphite layers 407 correspond to the graphite layers 31.

In another method of making graphite layers 407, graphite sheets 406 may be wound and fixed around the outer peripheral surface of a roller, and the roller may be pressed against second resin layers 404. As a result, the graphite layers 407 can be made on the second resin layers 404.

Examples of another method of layering a conductive fiber base material include a method in which short fibers are uniformly sprinkled on the surfaces of a first resin layer 37 to layer the short fibers when the short fibers are used as conductive fiber base materials 35. Examples of another method include a method in which short fibers are uniformly sprinkled on resin surfaces of second resin layers 33, and heated and pressurized to obtain the second resin layers 33 with conductive fiber base materials 35 in which the short fibers are layered on one face of each of the second resin layers 33. With regard to such second resin layers 33 with conductive fiber base materials 35, the second resin layers 33 themselves have high strength and high elastic moduli. A separator member 30 for a fuel cell, in which the second resin layers 33 with the conductive fiber base materials 35 are used, can be obtained by layering the second resin layers 33 with the conductive fiber base materials 35 on both faces of a first resin layer 37 so that the short fibers come into contact with both the faces, and by heating and pressurizing the second resin layers 33 with the conductive fiber base materials 35.

EXAMPLES

The present disclosure is described in more detail with reference to Examples and Comparative Examples below. The present disclosure is not limited to Examples below.

The following component was specifically used as each component included in resin compositions in Examples and Comparative Examples.

(Materials of First Resin Layer)

(1) Main agent A: cresol novolac type epoxy resin, epoxy equivalent of 211 g/eq (EOCN-102S-70, manufactured by Nippon Kayaku Co., Ltd.), (2) Curing agent A: novolac type phenol resin, hydroxyl equivalent of 105 g/eq (BRG-556, manufactured by Aica Kogyo Company, Limited), (3) Reinforcing agent: phenoxy resin (YP-50, manufactured by Nippon Steel & Sumikin Chemical Co., Ltd.), (4) Curing accelerator A: 2-undecylimidazole (C11Z, manufactured by SHIKOKU CHEMICALS CORPORATION), (5) Internal mold release agent: carnauba wax (Carnauba Wax No. 1 Powder, manufactured by Nippon Wax Co., Ltd.), and (6) Conductive filler A: artificial graphite, average particle diameter of 25 μm (SGP-25, manufactured by SEC CARBON, LIMITED).

(Graphite Sheet)

(1) Graphite sheet A: thickness of 200 μm, density of 1.0 g/cm$^3$, volume resistivity of 0.7 mΩ·cm (PF-20 manufactured by TOYO TANSO CO., LTD.), and (2) Graphite sheet B: thickness of 40 μm, density of 2.0 g/cm$^3$, volume resistivity of 0.1 mΩ·cm (artificial graphite sheet).

(Material of Second Resin Layer)

(1) Main agent B: bisphenol A type epoxy resin, epoxy equivalent of 189 g/eq (JER828, manufactured by Mitsubishi Chemical Corporation), (2) Curing agent A: novolac type phenol resin, hydroxyl equivalent of 105 g/eq (BRG-556, manufactured by Aica Kogyo Company, Limited), (3) Reinforcing agent: phenoxy resin (YP-50, manufactured by Nippon Steel & Sumikin Chemical Co., Ltd.), (4) Curing accelerator A: 2-undecylimidazole (C11Z, manufactured by SHIKOKU CHEMICALS CORPORATION), and (5) Conductive filler B: acetylene black (Denka Black 100% Press, manufactured by Denka Company Limited).

(Conductive Fiber Base Material)

(1) Carbon fiber non-woven fabric A: basis weight of 10 g/m$^2$ (CFP-010PV, manufactured by Nippon Polymer Sangyo Co., Ltd.), and (2) Carbon fiber non-woven fabric B: basis weight of 30 g/m$^2$ (CFP-030PE, manufactured by Nippon Polymer Sangyo Co., Ltd.).

In Examples and Comparative Examples, production of samples, each evaluation method, and each measurement method were performed as follows.

(1) Resin Sheet for First Resin Layer (1-1) Resin Composition for First Resin Layer Each of 100 parts by mass of the main agent A, 48.8 parts by mass of the curing agent A, and 35 parts by mass of the reinforcing agent was dissolved in methyl ethyl ketone, and each of the solutions was added into a container to prepare a liquid mixture. Then, each of a solution obtained by dissolving 3 parts by mass of the curing accelerator A in methanol, 560 parts by mass of the conductive filler A, and 1 part by mass of the internal mold release agent was added to the liquid mixture, the resultant was sufficiently stirred at room temperature, and methyl ethyl ketone was added to the resultant so that the resultant had a viscosity within a range of 100 to 3000 mPa·s, to obtain a resin composition for a first resin layer.

(1-2) Resin Sheet for First Resin Layer

The resin composition for a first resin layer was applied to a release face of a film with a thickness of 38 μm, subjected to mold release treatment (PET38X, manufactured by LINTEC Corporation) so that the dried resin composition had a thickness of 400 μm, and was then dried under conditions of 70° C. and 7 minutes to obtain resin sheets for a first resin layer. Then, two resin sheets for a first resin layer were layered so that resin faces of the resin sheets fit each other. Then, the layered resin sheets were pressure-bonded to each other under conditions of 80° C., 0.4 m/min, and 0.6 MPa using a laminating machine (VA-700, manufactured by TAISEI LAMINATOR CO, LTD.) to obtain a resin sheet for a first resin layer, having a thickness of 620 μm.

(2) Resin Sheet for Second Resin Layer (2-1) Resin Composition for Second Resin Layer Each of 100 parts by mass of the main agent B, 54.5 parts by mass of the curing agent A, and 35 parts by mass of the reinforcing agent was dissolved in methyl ethyl ketone, and each of the solutions was added into a container to prepare a liquid mixture. Then, each of a solution obtained by dissolving 3 parts by mass of the curing accelerator A in methanol, and 48 parts by mass of the conductive filler B was added to the liquid mixture, the resultant was sufficiently stirred at room temperature, and methyl ethyl ketone was added to the resultant so that the resultant had a viscosity within a range of 100 to 3000 mPa·s, to obtain a resin composition for a second resin layer.

(2-2) Resin Sheet for Second Resin Layer

The resin composition for a second resin layer was applied to a release face of a film with a thickness of 38 μm, subjected to mold release treatment (PET38X, manufactured by LINTEC Corporation) so that the dried resin composition had a thickness of 20 μm, and was then dried under conditions of 70° C. and 3 minutes to obtain a resin sheet for a second resin layer.

(3) Separator Member 10 for Fuel Cell

A separator member 10 for a fuel cell was produced as described below. A graphite sheet was affixed to an adhesive face of a pressure-sensitive adhesive sheet (SPV Tape manufactured by Nitto Denko Corporation). The pressure-sensitive adhesive sheet was pressure-bonded under conditions of 80° C., 0.4 m/min, and 0.6 MPa using a laminating machine. Then, the graphite sheet was peeled from the pressure-sensitive adhesive sheet, to obtain a pressure-sensitive adhesive sheet with graphite, to which part of the graphite sheet adhered. The two pressure-sensitive adhesive sheets were prepared, respective faces, to which the graphite adhered, of the pressure-sensitive adhesive sheets were affixed to both faces of the resin sheet for the first resin layer, from which the films were peeled, and the faces were pressure-bonded under conditions of 80° C., 0.4 m/min, and 0.6 MPa. Then, the pressure-sensitive adhesive sheets were peeled to obtain the separator member 10 for a fuel cell, of which both faces were provided with the graphite layers. In such a case, the layering amount of the graphite layers of the separator member 10 for a fuel cell was 1.8 g/m$^2$ (0.9 g/m$^2$ on each face). The layering amount of the graphite layer was determined in the following procedure. Each of a resin sheet for a first resin layer, which has not yet been provided with a graphite layer, and a resin sheet for a first resin layer, which has been provided with a graphite layer, was prepared. Each resin sheet was cut in a square measuring 10 cm per side. Each of the masses of the cut resin sheets was measured. Then, the mass of the resin sheet, which has not yet been provided with the graphite layer, was subtracted from the mass of the resin sheet for a first resin layer, which has been provided with the graphite layer. A value calculated by dividing a mass, obtained by the subtraction, by the area of the cut sample was regarded as the layering amount of the graphite layer per unit area.

(4) Separator Member 30 for Fuel Cell

A separator member 30 for a fuel cell was produced as described below. First, a carbon fiber non-woven fabric was layered on the resin face of the resin sheet for the second resin layer, and pressure-bonded under conditions of 100° C., 0.4 m/min, and 0.6 MPa using a laminating machine. Then, the film was peeled from the resin sheet for the second resin layer, a graphite sheet was layered on the resin face, and pressure-bonded under condition of 80° C., 0.4 m/min, and 0.6 MPa, and the graphite sheet was then peeled to obtain a layered body made by layering the carbon fiber non-woven fabric, the resin sheet for the second resin layer, and the graphite layer in the order mentioned. In such a case, the layering amount of the graphite layer was 12 g/m$^2$. The two layered bodies were prepared, the respective layered bodes were layered on both faces of the resin sheet for the first resin layer so that faces of the carbon fiber non-woven fabrics fit both the faces, and pressure-bonded under conditions of 100° C., 0.2 m/min, and 0.6 MPa to obtained the separator member 30 for a fuel cell. In a method of measuring the layering amount of the graphite layer in the separator member 30 for a fuel cell, the layering amount was determined in the same procedure as the above-described procedure of determining the layering amount of the graphite of the separator member 10 for the fuel cell except that the resin sheet for the first resin layer, which has not yet been provided with the graphite layer, and the resin sheet for the first resin layer, which has been provided with the graphite layer, were changed to the resin sheet for the second resin layer with the carbon fiber non-woven fabric, which has not yet been provided with the graphite layer, and the resin sheet for the second resin layer with the carbon fiber non-woven fabric, which has been provided with the graphite layer.

<Measurement of Volume Resistivity>

Conductivity was evaluated by measuring a volume resistivity.

(1) Production of Sample for Measurement

A separator member (sample) for a fuel cell, cut in 100 mm×100 mm, was prepared. A mold release agent (RIM-RIKEIN-849, manufactured by Chukyo Yushi Co., Ltd.) was applied to the hot plate of a pressing machine (Manual Hydraulic-Pressure Hot Press IMC-185B (improved), manufactured by Imoto machinery Co., LTD), and the sample was placed, and press-molded under conditions of 180° C., 3 minutes, and 20 MPa, to obtain a sample for measurement of a flat plate.

(2) Measurement Method

The volume resistivity (mu cm) of the sample for measurement was measured using a four-point probe method (RM3545, manufactured by HIOKI E.E. CORPORATION) in conformity with JIS K7194.

<Measurement of Thickness>

The thickness was measured using a micrometer when the sample for measurement was produced. The thickness of the graphite layer was measured using an optical microscope.

<Measurement of Strength>

(1) Production of Sample for Measurement

The sample produced for measuring the volume resistivity was cut to make a sample for measurement, having a width of 10 mm and a length of 20 mm.

(2) Measurement Method

The measurement was performed using an autograph test machine (AG-10, manufactured by SHIMADZU CORPORATION). In the measurement, a breaking load was measured by performing three-point bending (supporting-point distance of 10 mm and test rate of 2 mm/min). Strength (MPa) was calculated from the obtained breaking load in conformity with HS K7171.

<Measurement of Moisture Vapor Transmission Rate>

A gas barrier property was evaluated by measuring a moisture vapor transmission rate.

(1) Production of Sample for Measurement

The sample produced for measuring the volume resistivity was cut to make a sample for measurement, having a circular shape having a diameter of 76 mm.

(2) Measurement Method

The moisture vapor transmission rate (%) was measured under conditions of 40° C. and 90% RH in conformity with JIS Z0208, and determined as a value (g/m$^2$·24 h) of a 24-hour moisture permeability amount per square meter. Evaluation criteria were as follows.

Excellent: moisture vapor transmission rate of less than 13%

Good: moisture vapor transmission rate of 13% or more and less than 32%

Poor: moisture vapor transmission rate of 32% or more

<Workability>

Workability was evaluated by confirming whether or not the resin adhered to the hot plate of the pressing machine by visual observation when the sample for measurement was produced by press. Evaluation criteria were as follows.

Good: No adhesion of resin to hot plate of pressing machine

Poor: Adhesion of resin to hot plate of pressing machine

<Swelling after Working>

Whether or not the worked sample was swollen was confirmed by visual observation. Evaluation criteria were as follows.

Good: No swelling, or no practical problem even with swelling

Poor: Swelling and practical problem

Example 1 (Separator Member 10 for Fuel Cell, Configuration of Graphite Layers on Both Faces)

A separator member 10 for a fuel cell, of which both faces were provided with graphite layers, was produced according to (3) the procedure of producing the separator member 10 for a fuel cell.

Example 2 (Separator Member 10 for Fuel Cell, Configuration of Graphite Layer on One Face)

A separator member 10 for a fuel cell, of which only one face was provided with a graphite layer, was produced according to (3) the procedure of producing the separator member 10 for a fuel cell.

Example 3 (Separator Member 30 for Fuel Cell, Configuration of Graphite Layers on Both Faces)

A separator member 30 for a fuel cell, of which both faces were provided with graphite layers, was produced according to (4) the procedure of producing the separator member 30 for a fuel cell using the carbon fiber non-woven fabric A as a carbon fiber non-woven fabric.

Example 4 (Separator Member 30 for Fuel Cell, Configuration of Graphite Layers on Both Faces)

A separator member 30 for a fuel cell, of which both faces were provided with graphite layers, was produced according to (4) the procedure of producing the separator member 30 for a fuel cell using the carbon fiber non-woven fabric B as a carbon fiber non-woven fabric.

Comparative Example 1 (Separator Member 10 for Fuel Cell without any Graphite Layer)

A resin sheet for a first resin layer, having a thickness of about 360 μm, was produced according to (1-2) the procedure of producing the resin sheet for the first resin layer. The resin sheet was used as a separator member 10 for a fuel cell without any graphite layer.

Comparative Example 2 (Separator Member 10 for Fuel Cell, Layering Amount of Graphite Layer is More than 200 g/m$^2$)

A resin sheet for a first resin layer, having a thickness of 100 μm, was produced according to (1-2) the procedure of producing the resin sheet for the first resin layer. The graphite sheets A were layered on both faces of the resin sheet, and pressure-bonded to both the faces under conditions of 80° C., 0.2 m/min, and 0.6 MPa to produce a separator member 10 for a fuel cell including a graphite layer having a layering amount of 200 g/m² on one face.

Comparative Example 3 (Separator Member 10 for Fuel Cell, Layering Amount of Graphite Layer is More than 80 g/m²)

A resin sheet for a first resin layer, having a thickness of 550 µm, was produced according to (1-2) the procedure of producing the resin sheet for the first resin layer. The graphite sheets B were layered on both faces of the resin sheet, and pressure-bonded to both the faces under conditions of 80° C., 0.2 m/min, and 0.6 MPa to produce a separator member 10 for a fuel cell including a graphite layer having a layering amount of 80 g/m² on one face.

REFERENCE SIGNS LIST 10, 30 Separator member for fuel cell
11, 31, 210, 407 Graphite layer
13, 37, 203, 402 First resin layer
201, 401, 409 Application apparatus
205, 403 Film
207, 406 Graphite sheet
209, 408 Roller
33, 404 Second resin layer
35, 405 Conductive fiber base material
410 Pressing machine
206, 220, 420, 430, 440, 450 Layered body

What is claimed is:

1. A separator member for a fuel cell, comprising:
a first resin layer including a resin; and
a graphite layer that is layered on the first resin layer and substantially made of graphite, wherein

TABLE 1

| | Example 1 | Example 2 | Example 3 | Example 4 | Comparative Example 1 | Comparative Example 2 | Comparative Example 3 |
|---|---|---|---|---|---|---|---|
| Thickness (µm) of sample | 364 | 351 | 375 | 407 | 361 | 400 | 403 |
| layering amount (g/m²) of graphite layer (on one face) | 0.9 | 0.9 | 12.4 | 12.7 | 0 | 200 | 80 |
| Thickness (µm) of graphite layer (on one face), *measured with optical microscope | Unmeasurable (theoretical value of 2.6) | Unmeasurable (theoretical value of 2.6) | 36 | 28 | 0 | 171 | 44.7 |
| Volume resistivity (mΩ · cm) | 7.8 | 7.4 | 6.3 | 4.8 | 9.2 | 1 | 0.5 |
| Strength (MPa) | 66 | 71 | 117 | 187 | 66 | 24 | 59 |
| Moisture vapor transmission rate | Good | Good | Excellent | Excellent | Poor | Poor | Good |
| Workability | Good | Good (*) | Good | Good | Poor | Good | Good |
| Swelling after working | Good | Good | Good | Good | Good | Good | Poor |

(*) In Example 2, a film was disposed and molded on a face provided with no graphite layer.

Based on the results in Table 1, the volume resistivities, as the indicators of conductivity, in all of Examples 1 to 4 were lower than the volume resistivity in Comparative Example 1, and the moisture vapor transmission rates, as the indicators of a gas bather property, in all of Examples 1 to 4 were better than the moisture vapor transmission rates in Comparative Examples 1 and 2. Workability and swelling after working were good in all of Examples. Further, the strengths in Examples 3 and 4 were found to be at least 1.7 or more times higher than the strengths in Comparative Examples.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-98939, filed on Jun. 5, 2020, the entire disclosure of which is incorporated by reference herein.

INDUSTRIAL APPLICABILITY

A separator member for a fuel cell of the present disclosure has industrial applicability for the member of a separator for a fuel cell.

a layering amount of the graphite layer is of 0.5 to 30 g/m²,
a volume resistivity of the graphite is 3 mΩ·cm or less,
a material included in the graphite layer includes 95% by weight or more of graphite,
a conductive fiber base material and a second resin layer including a resin are layered between the first resin layer and the graphite layer in order in which the conductive fiber base material is closer to the first resin layer than the second resin layer, and
a thickness of the second resin layer is smaller than a thickness of the first resin layer.

2. The separator member according to claim 1, wherein the resin is a thermoplastic resin composition or a thermosetting resin composition.

3. A method of manufacturing a separator member for a fuel cell, the method comprising:
a first resin layer making step of making a first resin layer including a resin; and
a graphite layer making step of making, on the first resin layer, a graphite layer that has a layering amount of 0.5 to 30 g/m² and is substantially made of graphite having a volume resistivity of 3 mΩ·cm or less,
a material included in the graphite layer includes 95% by weight or more of graphite,
providing a conductive fiber base material and a second resin layer including a resin that are layered between the first resin layer and the graphite layer in order in which the conductive fiber base material is closer to the first resin layer than the second resin layer, and wherein a thickness of the second resin layer is smaller than a thickness of the first resin layer.

4. The method according to claim 3, wherein the graphite layer making step comprises: a graphite sheet layering step of layering a graphite sheet including the graphite on the first resin layer and pressure-bonding the graphite sheet to the first resin layer; and a peeling step of peeling the graphite sheet after the graphite sheet layering step.

5. The method according to claim 3, wherein the first resin layer making step comprises: a resin application step of applying the resin to a film subjected to mold release treatment; and a resin curing step of making the first resin layer in a semi-curing state.

6. A method of manufacturing a separator member for a fuel cell, the method comprising:
   a resin application step of applying a resin to a film subjected to mold release treatment;
   a first resin layer making step of curing the resin to be in a semi-curing state to make a first resin layer;
   a graphite sheet layering step of layering a graphite sheet including graphite having a volume resistivity of 3 mΩ·cm or less on the first resin layer, the graphite layer having a layering amount of 0.5 to 30 g/m² and pressure-bonding the graphite sheet to the first resin layer; wherein a material included in the graphite layer includes 95% by weight or more of graphite;
   a film peeling step of peeling the film from the first resin layer;
   a second graphite sheet layering step of layering a graphite sheet including graphite having a volume resistivity of 3 mΩ·cm or less on a face of the first resin layer from which the film is peeled and pressure-bonding the graphite sheet to the face;
   a peeling step of peeling the graphite sheets from both faces of the first resin layer, and
   providing a conductive fiber base material and a second resin layer including a resin that are layered between the first resin layer and the first graphite sheet in order in which the conductive fiber base material is closer to the first resin layer than the second resin layer, and wherein
   a thickness of the second resin layer is smaller than a thickness of the first resin layer.

7. A method of manufacturing a separator member for a fuel cell, the method comprising:
   a first resin layer making step of making a first resin layer including a resin;
   a second resin layer making step of making a second resin layer in a semi-curing state, including a resin and having a thickness that is smaller than a thickness of the first resin layer;
   a conductive fiber base material layering step of layering a conductive fiber base material on the second resin layer and pressure-bonding the conductive fiber base material to the second resin layer by heating;
   a graphite layer making step of making a graphite layer that has a layering amount of 0.5 to 30/m², and is substantially made of graphite having a volume resistivity of 3 mΩ·cm or less on a resin face of the second resin layer, on which the conductive fiber base material is layered;
   a material included in the graphite layer includes 95% by weight or more of graphite; and
   a first resin layer layering step of layering the first resin layer on the conductive fiber base material of the second resin layer, and heating and pressurizing the first resin layer and
   providing a conductive fiber base material and a second resin layer including a resin that are layered between the first resin layer and the first graphite sheet in order in which the conductive fiber base material is closer to the first resin layer than the second resin layer, and wherein
   a thickness of the second resin layer is smaller than a thickness of the first resin layer.

8. The method according to claim 7, wherein the first resin layer making step comprises: a resin application step of applying the resin to a film subjected to mold release treatment; and a resin curing step of making the first resin layer in a semi-curing state.

9. The method according to claim 7, wherein the second resin layer making step comprises: a second resin application step of applying the resin to a film subjected to mold release treatment; and a second resin curing step of making the second resin layer in a semi-curing state.

10. The method according to claim 7, wherein the graphite layer making step comprises: a graphite sheet layering step of layering a graphite sheet including the graphite on a resin face of the second resin layer, on which the conductive fiber base material is layered, and pressure-bonding the graphite sheet to the resin face; and a peeling step of peeling the graphite sheet after the graphite sheet layering step.

* * * * *